United States Patent [19]

Thomason et al.

[11] 4,343,293
[45] Aug. 10, 1982

[54] SOLAR DOMESTIC WATER HEATER

[76] Inventors: Harry E. Thomason; Harry J. L. Thomason, Jr., both of 609 Cedar Ave., Fort Washington, Md. 20022

[21] Appl. No.: 203,427
[22] Filed: Nov. 3, 1980
[51] Int. Cl.³ ............................................. F24J 3/02
[52] U.S. Cl. ............................... 126/400; 126/437
[58] Field of Search ............... 126/437, 400, 435, 430, 126/436; 165/18, 154, 157; 62/238.6, 439, 396

[56] References Cited

U.S. PATENT DOCUMENTS

| | | | |
|---|---|---|---|
| 2,125,842 | 8/1938 | Eggleston | 62/238.6 |
| 4,010,734 | 3/1977 | Chayet | 126/422 |
| 4,082,143 | 4/1978 | Thomason | 126/400 |
| 4,102,327 | 7/1978 | Thomason | 126/437 |
| 4,139,055 | 2/1979 | Thomason | 126/400 |
| 4,153,043 | 5/1979 | Goolsby | 126/437 |
| 4,233,960 | 11/1980 | Johnson | 126/400 |
| 4,287,879 | 9/1981 | Roark | 126/437 |

Primary Examiner—Daniel J. O'Connor

[57] ABSTRACT

In the field of solar heating, domestic water heating is accomplished by flowing the potable (city) water through an inner tank which is bathed in a non-toxic liquid in a slightly larger tank, which, in turn, is bathed in an outer tank containing liquid that is circulated to a solar heat collector for heating.

2 Claims, 1 Drawing Figure

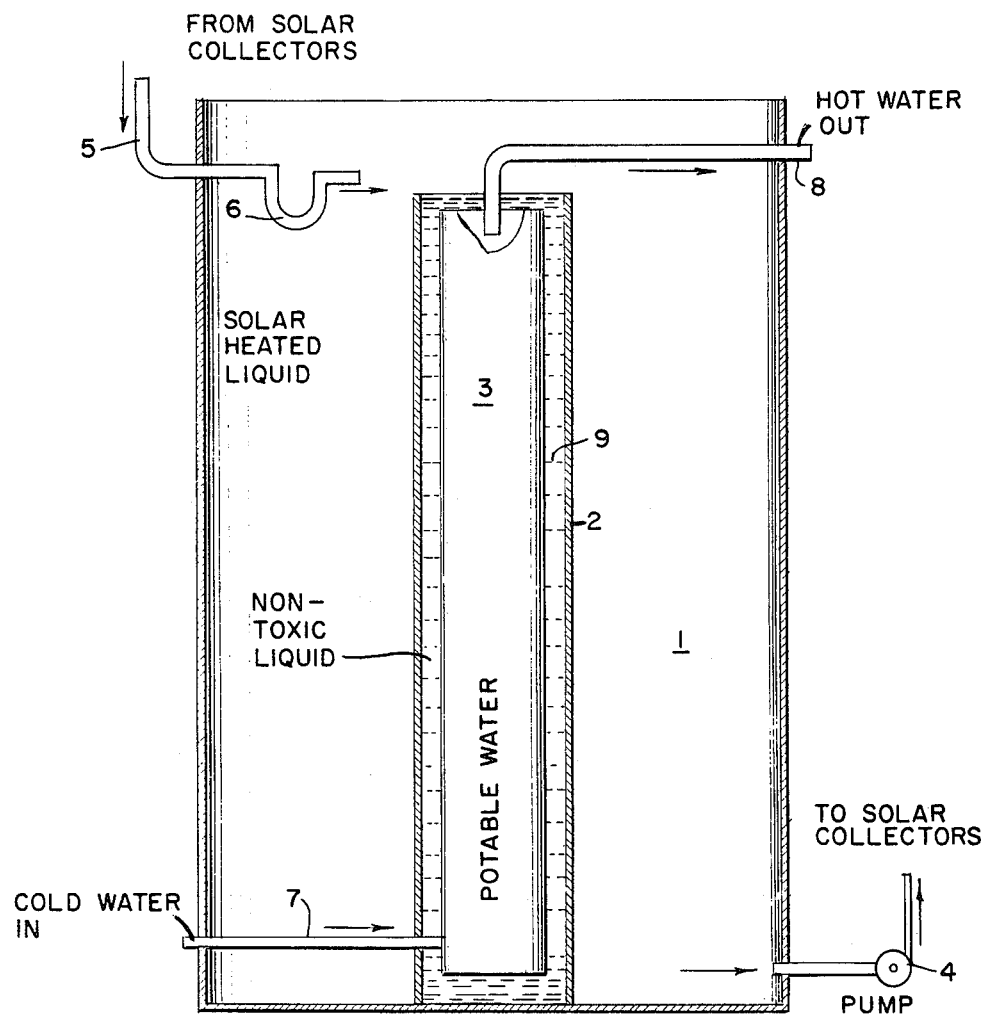

SOLAR DOMESTIC WATER HEATER

INTRODUCTION

For many years Thomason "SOLARIS" solar heating systems have been heating domestic water, as well as homes. The liquid that is in the inner tank is pressurized "drinking" water. The water that is pumped to the solar collectors is also clean rain, city or well water, or water that is "cleaned up" by use of a deionizer. That water is not under pressure. Therefore, if a rupture should occur in the inner tank, the pressure inside would cause that potable water to flow out into the outer tank, and out through an overflow. There was no need for anti-freeze, anti-corrosion materials and so on in genuine Thomason "SOLARIS" Systems. They could not freeze up, because of open-flow, trickle collectors that always drain down, and materials that do not corrode rapidly.

In recent years, hundreds of entrepreneurs have moved into the field of Solar Energy. They neglected safety and used dangerous liquids in solar heat collectors and systems (e.g. deadly poisonous liquids containing anti-freeze, anti-corrosion materials, and so on). The authorities stepped in and regulated, requiring double-wall heat exchangers to protect the public from those poisonous and toxic liquids. In most cases they permitted single-wall heat exchangers where only non-toxic liquid is used in the solar system, as in the case of a tank-within-a-tank, as in Thomason "SOLARIS" Systems. But, in some jurisdictions, the authorities did not catch onto the distinction so they passed local codes requiring double-wall heat exchangers in all solar domestic water-heating systems.

As a result of such ill-advised local codes, solar systems in some Counties and a few States require expensive heat exchangers. Heat transfer from solar-to-DHW is retarded. Costs are increased due to the requirement for an expensive double-wall heat exchanger, a pump to circulate the solar collector fluid through the heat exchanger, extra pipes, and electricity to operate the circulating pump, etc. Also, heat is wasted in warming the liquid in the solar collector and piping each morning, only to be lost again that night, and when a cloud covers the sun. But they must be that way to meet those codes. The present invention meets them, while keeping costs low and keeping solar apparatus simple.

In the drawing, the single FIGURE illustrates the invention.

Outer tank 1 has a smaller tank 2 inside with a still-smaller tank 3 inside of tank 2. Liquid from tank 1 is circulated to a solar collector by pump 4 and solar-heated water flows back by return line 5, preferably through trap 6. Trap 6 prevents loss of water and/or heat which would occur if "steam" or water vapor were allowed to go up pipe 5.

Cold "city" or well water flows into tank 3 through pipe 7 and hot, solar-heated water flows out to the tap through pipe 8. Heat from the liquid in tank 1 is transferred to tank 3 by liquid 9 in tank 2.

OPERATION

Heat collected from a solar collector, not shown, is stored primarily in the liquid in larger outer tank 1. Additional heat is stored in the liquid 9 in tank 2, which derives its heat from the surrounding liquid in tank 1 and transfers it into inner tank 3. Inner tank 3 also stores solar-produced heat. In addition, tank 3 contains an ever-ready supply of already-heated domestic water. That is very important for times when 10 or 20 or 50 or 100 gallons, or more, of hot water are needed in a hurry. With ordinary heat exchangers the heat cannot be transferred fast enough. Consequently, the temperature of the domestic hot water will drop to 10, 20, 30 or more degrees below the temperature of liquid going through the solar heat collectors. As an example, at the Hogate's Restaurant in Washington, D.C., the solar-heated liquid temperatures were monitored on Oct. 30, 1980. During a bright sunny period, at 2:00 P.M., the liquid going to that vast array of solar collectors was at 112°, and that returning was at 131°. The water in storage was at only 98°. That meant the heat exchangers were dropping the temperature from 112°–131° down, and heating the stored DHW to only 98°. The air was almost calm and the air was cool, about 55°. The sky included fleecy clouds, blocking out very little sunshine. At 11:30 A.M., the stored DHW was at only 80° and the liquid to the collectors was at 89°, with 101° return to the heat exchanger from the collectors.

Due to the relatively inefficient rate of heat transfer, the solar heat collectors must operate much hotter than the storage temperatures. Cold winds steal away much of the solar heat from those hot collectors. That means fewer BTUs are collected, and fewer T.S.U.s are delivered to storage. More oil or gas or electricity is required, and the fuel bill goes up.

The present invention increases the BTUs collected, the T.S.U.s delivered to the DHW, and reduces the fuel bill, while providing a double-wall heat exchanger for those jurisdictions requiring it.

It will be noted that only one pump is required for the entire system. No separate pump is needed for circulating liquid through the double wall heat exchanger. The heat is transferred naturally, by conduction and natural thermosyphon phenomonae, without using electricity for a separate pump, as at the Hogate's Restaurant and many other installations.

The old Thomason U.S. Pat. No. 3,236,294, discloses an outer tank 65 and an inner tank 66. The inner tank is shown located, arbitrarily, about mid-way between the top and bottom of the outer tank. In other Thomason patents such as U.S. Pat. No. 3,254,703, filed at about the same time, the inner tank 27 is located near the top of outer tank 28. Actual installations were made with the inner tank (42 gallons, for example) setting on cinder blocks inside of the outer tank (275 gallons, for example). Dr. Thomason considered that to be desirable so the heat from the warmest water, near the top in the outer tank, would be transferred more readily to the inner tank.

However, it has been found that the inner tank should extend almost to the bottom, and almost to the top of the outer tank, as illustrated in the present drawing. That way, heat near the top of the outer tank is transferred readily to the liquid in the tops of the inner containers, always assuring the warmest DHW possible. And, heat that is available at the bottom of the outer tank will pre-heat the cold "city" water as it enters the inner container. Then, it is heated more-and-more, naturally, by warm convection currents as it approaches the top where the warmest solar-heated water is available. Heat-transfer is maximized and the warmest-possible water flows out at pipe 8.

We claim:

1. Solar domestic water heater apparatus comprising a first outer container containing a heat-storage, heat-transfer liquid to be circulated to a solar heat collector, a second container inside of said first container containing a heat-storage, heat-transfer liquid, and a third container inside of said second container containing stored solar-produced heat in the form of relatively clean liquid such as water, said liquid in said first container not necessarily being potable and said liquid in said third container being potable, said third container and said second container extending downward to a point almost as low as the bottom of said first container and almost as high as the top of said first container.

2. Apparatus as in claim 1 and a return pipe from the solar collector, and a trap in the return line to prevent escape of warm or hot "steam" up the solar collector return pipe.

* * * * *